July 6, 1926.
W. N. BOOTH
1,591,273
DEMOUNTABLE RIM CLAMP
Filed April 2, 1919
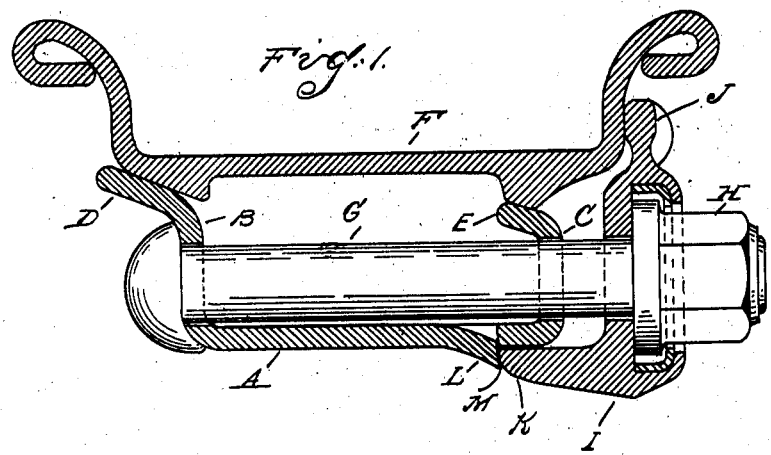
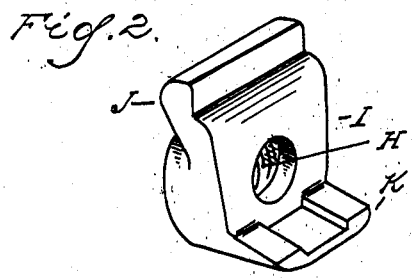
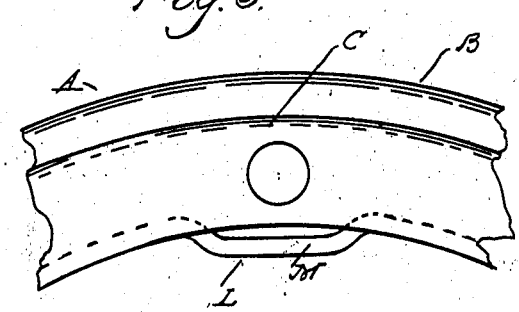
Inventor
William N. Booth
By Whittemore Hulbert & Whittemore
Attorneys Patented July 6, 1926.

1,591,273

UNITED STATES PATENT OFFICE.

WILLIAM N. BOOTH, OF DETROIT, MICHIGAN.

DEMOUNTABLE-RIM CLAMP.

Application filed April 2, 1919. Serial No. 286,993.

The invention relates to demountable rims for vehicle wheels of that type in which the rim on one side engages a conical seat on the felly, while the opposite side is engaged by clamping lugs.

Various constructions of clamping lugs have heretofore been employed, some of which have been provided with wedge portions for insertion between the felly and rim, while others have depended solely upon the clamping action. The lug is usually swivelled to the nut for engaging the clamping bolt, and to insure a firm engagement of the lug with the rim a fulcrum bearing is sometimes provided on the opposite side of the bolt. Also various expedients have been used for holding the lug from rotation when the nut is screwed on to the bolt.

With the present construction I have provided a fulcrum bearing for the lug by striking out a portion of the underside of the felly, and to prevent rotation of the lug there is provided a portion underlapping the felly and engaging said fulcrum bearing. Thus in entering the nut upon the bolt and during the screwing up of the nut the lug will be held from rotation, while the fulcrum bearing will cause the lug to firmly clamp the rim.

In the drawings:

Figure 1 is a cross-section through the felly and demountable rim with the clamping lug in engagement therewith;

Figure 2 is a perspective view of the clamping lug detached;

Figure 3 is a side elevation of the felly, showing the manner of striking out the fulcrum bearing.

A is a metallic felly, preferably of channel cross-section, having the outwardly extending side flanges B and C terminating in the laterally flaring flanges D and E. The flange D forms a seat for one side of the demountable rim F while the flange E forms a guide bearing for said rim. G is a clamping bolt which passes through the flanges B and C of the felly and extends beyond the latter to engage the nut H which is swivelled to the clamping lug I. This lug has a portion J on one side of the bolt for engaging the rim F, while upon the opposite side of the bolt there is a portion for engaging the fulcrum bearing.

To hold the lug from rotation the portion K, which engages the fulcrum bearing, extends laterally inward underlapping the bottom portion of the felly. The inner end of this portion K abuts against a fulcrum bearing on the felly, and the latter is formed by striking downward a portion L from the bottom of the channel. This downwardly struck portion is preferably sheared but may, if desired, be deflected less than the thickness of the metal so as to leave no opening in the felly. The sheared edge will form a square or undercut shoulder M against which the portion K of the lug bears, so that when the nut is tightened the portion J will be firmly clamped to the rim.

In operation when the lug is first placed upon the bolt and the nut engaged with the threads of the bolt the portion K will underlap the felly. This will hold the lug from rotation while the nut is being screwed upon the bolt, and as soon as the inner end of the portion K abuts against the fulcrum bearing M the portion J will exert clamping pressure upon the rim.

What I claim as my invention is:

1. The combination with a wheel felly and a demountable rim therefor, of means for securing said rim to said felly, comprising a clamping lug provided with a portion overlapping a portion of the felly, and a fulcrum bearing on said felly forming an end abutment for engagement by the overlapping portion of said lug.

2. The combination with a wheel felly and a demountable rim therefor, of means for securing said rim to said felly, comprising a clamping lug having a portion for engaging said rim and a portion extending transversely therefrom overlapping the felly, and a fulcrum bearing on said felly forming an end abutment for engagement by said transversely projecting portion of the lug.

3. The combination with a wheel felly and a demountable rim therefor, of means for securing said rim to said felly, comprising a clamping bolt, a clamping lug engaging said bolt and having on one side thereof a portion for engaging said rim and upon the opposite side a transversely projecting portion extending beneath the felly, and a fulcrum bearing for said lug on said felly and on the side adjacent to the transversely projecting portion of said lug, said fulcrum bearing forming an end abutment for engagement by said transversely projecting portion of said lug.

4. The combination with a wheel felly and a demountable rim therefor, of means for securing said rim to said felly, comprising a clamping bolt and a clamping lug comprising a portion extending in a plane transverse to the axis of said bolt, and a portion extending parallel to the axis of said bolt lying adjacent to the underside of the felly, and a projection upon said felly forming a fulcrum bearing for said lug.

5. The combination with a wheel felly and a demountable rim therefor, of means for securing said rim to said felly, comprising a bolt extending laterally from said felly, a nut for engagement with said bolt, an apertured clamping lug adjacent to said nut having a portion extending transverse to the axis of the bolt for engaging said rim and a portion extending substantially parallel to the axis of the bolt and underlapping the felly, and a shoulder on said felly forming a fulcrum bearing for said last-mentioned portion of the lug.

6. The combination with a wheel felly and a demountable rim, of means for securing said rim to said felly, comprising a clamping lug for said rim having a transversely projecting portion underlapping the felly, and a struck-out portion on said felly forming a fulcrum bearing for said lug.

7. The combination with a wheel felly and a demountable rim, of means for securing said rim to said felly, comprising a clamping lug and a fulcrum bearing for said lug formed by a struck-out portion of said felly on the underside thereof.

8. The combination with a wheel felly and a demountable rim, of means for securing said rim to said felly, comprising a clamping lug and a fulcrum bearing for said lug formed by a sheared portion of said felly on the underside thereof, the angle of the shear being such as to form an undercut shoulder for said lug.

9. The combination with a metallic wheel felly of channel cross section and a demountable rim for engagement therewith, of inwardly stamped projections upon the bottom of said felly, and means including members bearing on said projections for clamping said rim on said felly.

10. The combination with a wheel felly and a demountable rim for engagement therewith, of stamped-out projections on said felly extending inwardly therefrom, and means including members bearing on said projections for clamping said rim on said felly.

11. In a device of the class described, the combination of a felly having a middle portion and side portions forming a channel, a stamped-up projection at one of said sides extending radially inward of said channel, a tire rim on said felly, and means, including a member contacting with said rim and projection, for clamping said rim on the felly.

12. In a device of the class described, the combination of a metal felly having a channel, a flange at one side of said channel forming a rim seat, stamped-up projections on said felly extending radially inward thereof, a tire rim on said felly, and means including members bearing on said projections, for clamping said rim on said felly.

13. In a device of the class described, the combination of a metal felly having a middle portion and side portions forming a channel, a stamped-up projection formed at the side of said channel and extending radially inward thereof, a tire rim on said felly, a member bearing on said projection and rim, one of said side portions and the last-named member having registering openings, and means, including a bolt passing through said registering openings, for clamping said parts together.

14. The combination of a metal felly having a channel, a flange at one side of said channel forming a rim seat, an inwardly extending projection on said felly, a demountable rim on said felly, and means including a member bearing on said projection for clamping said demountable rim on said felly.

15. The combination with a wheel felly, of an inwardly extending projection on said felly, a demountable rim on said felly, and means for clamping said demountable rim on said felly including a member having a bearing on said projection and adapted to fulcrum thereon during the final portion of the clamping movement of said member.

16. In a device of the class described, a rim, a felly having a supporting contact with said rim, a depressed portion on said felly directed radially inward, a clamp engaging the rim and said depressed portion, and means for moving said clamp about the depressed portion as a fulcrum for securing the rim to the felly.

17. In a device of the class described, a felly having a substantially cylindrical middle portion and side portions forming an annular channel, a tire rim on said felly, means for clamping said rim on said felly, said means including a member fulcrumed below the cylindrical portion of the base of the channel of the felly.

18. In a device of the class described, the combination of a felly having a substantially cylindrical portion, and side portions forming an annular channel, means integral with the cylindrical portion of the channel for forming fulcrum points and a plurality of clamps engaging said fulcrum points and clamping the rim to the felly.

In testimony whereof I affix my signature.

WILLIAM N. BOOTH